United States Patent [19]

Okada et al.

[11] Patent Number: 5,658,600

[45] Date of Patent: Aug. 19, 1997

[54] INJECTION MOLDING MACHINE HAVING ASSEMBLY FOR VIBRATION PROCESSING

[75] Inventors: Haruo Okada; Fumio Shiozawa; Toshimi Kato; Yuji Hayashi, all of Nagano-ken, Japan

[73] Assignee: Nissei Plastic Industrial Co., Ltd., Nagano-ken, Japan

[21] Appl. No.: 528,426

[22] Filed: Sep. 14, 1995

[30] Foreign Application Priority Data

Sep. 16, 1994 [JP] Japan .................... 6-248481
Nov. 25, 1994 [JP] Japan .................... 6-314237

[51] Int. Cl.⁶ .................................................. B29C 45/56
[52] U.S. Cl. ............... 425/192 R; 425/424; 425/432; 425/542; 425/556; 264/71
[58] Field of Search ................ 425/192 R, 553, 425/554, 556, 424, 432, 542, DIG. 51; 264/71

[56] References Cited

U.S. PATENT DOCUMENTS

5,069,833 12/1991 Yokoi et al. .................. 425/553
5,405,259 4/1995 Morikita .................. 425/556
5,439,371 8/1995 Sawaya .................... 425/556
5,472,335 12/1995 Morikita .................. 425/432
5,512,223 4/1996 Morikita .................. 425/556

*Primary Examiner*—James P. Mackey
*Attorney, Agent, or Firm*—Weingarten, Schurgin, Gagnebin & Hayes LLP

[57] ABSTRACT

An injection molding machine equipped with an assembly for vibration processing which efficiently performs processing operations on the resin in the mold with vibration overcomes the restriction of vibration frequency due to the limited response of return springs and due to vibration transfer loss from the vibratory rods to the vibratory plate when operating at a high frequency. The injection molding machine performs both vibration and ejection without an ejector plate by making the vibratory plate serve a dual purpose and thus enable reduction in both mold size and production cost.

7 Claims, 5 Drawing Sheets

INJECTION MOLDING MACHINE HAVING ASSEMBLY FOR VIBRATION PROCESSING

BACKGROUND OF THE INVENTION

1. Field of the Invention

The present invention relates to an injection molding machine having an assembly for vibration processing with which pressurization or cutting work such as gate cutting can be conducted by means of locally applying vibration during cooling of the resin injected into the cavity in a mold.

2. Background Art

Such injection molding machines are known and are used for a variety of processing operations such as punching, gate cutting, and partial compression on a synthetic resin and improvement of flowability of the resin by means of locally applying vibration to the resin in a mold at a vibration frequency of approximately 10 Hz.

The conventional injection molding machine comprises a movable mold half which is arranged in a movable manner relative to a stationary mold half, and a vibratory plate which is mounted within the movable mold half. A desired number of vibratory pins are secured onto the front surface of the vibratory plate with a distal or tip end thereof facing the cavity in the mold. The vibratory plate is abutted against vibratory rods equipped in a vibration generator operated by hydraulic pressure. The vibratory plate is vibrated back and forth by using return springs which generate a reaction force to locally oscillate the resin within the mold by using the vibratory pins during the processing of resin.

The conventional injection molding machine of the type described uses a proportional reducing valve or a servo valve to apply a vibratory force only in an advancing or forward direction. This causes the necessity to use the above-mentioned return springs to generate the reaction force in order to oscillate the resin. The return spring has only a limited level of response, which restricts the vibration frequency up to, about 10 Hz. In addition, there is a problem of vibration transfer loss from the vibratory rods to the vibratory plate with the conventional machine causing difficulties in operation at a high vibration frequency. Another problem is the difficulty in controlling the accurate positioning of the vibratory pins relative to the resin.

A typical injection molding indispensably requires ejector pins to remove molded products from the mold after the mold is opened. These ejector pins are projected from an ejector plate. For this purpose, the molding machine having an assembly for vibration processing contains the vibratory plate along with the ejector plate within the movable mold half. Such a construction makes it necessary to ensure a space for moving both plates. In addition, the plates should be assembled in such a manner that they do not interfere with each other. Therefore, the conventional injection molding machine is likely to have more complicated internal structure as compared with typical injection molds.

SUMMARY OF THE INVENTION

The first object of the present invention is to overcome the problem of limitation on the vibration frequency due to the limited response of the above-mentioned return springs and the problem associated with the vibration transfer loss from the vibratory rods to the vibratory plate causing difficulties in operation at a high vibration frequency, and to provide an injection molding machine having an assembly for vibration processing which is capable of efficiently processing the resin in the mold by using vibration.

In addition, the second object of the present invention is to provide an injection molding machine capable of applying vibration to the resin in the mold and ejecting the molded product therefrom even without an ejector plate by means of making a vibratory plate serve a double purpose, allowing reduction in both mold size and production cost by this common use of the vibratory plate.

According to the first aspect of the present invention to achieve the above mentioned first object, there is provided an injection molding machine comprising an injection mold formed of a stationary mold half attached to a stationary platen of the molding machine and a movable mold half attached to a movable platen which is movable relative to the stationary platen, the injection mold having a cavity formed between the mold halves when the mold is closed, a vibratory plate contained within the movable mold half and having a desired number of vibratory members secured onto the front surface thereof, the vibratory members being for use in locally pressurizing or cutting, with the application of pressure, the resin in the cavity, and a vibratory rod passing through a bottom plate from a vibration generator disposed behind the movable platen to the movable mold half, the vibratory rod having an end integrally connected to the vibratory plate.

In the above-mentioned constitution, the vibratory rod and the vibratory plate are connected integrally, so that the vibration generated by the vibration generator is directly transferred to the vibratory pins and hence the resin is oscillated or vibrates at the position contacting with the ends of the vibratory pins, subjected to such processing operations as punching and compression.

Accordingly, only the vibration generator is required for a variety of processing operations such as punching, gate cutting, and partial compression on a synthetic resin and improvement of flowability of the resin in the mold. When return springs are required, a vibration frequency used is restricted to approximately 10 Hz. On the contrary, the integral connection of the present invention allows the effective transmission of the vibration caused by the reciprocating motion of the piston in the vibration generator, so that less or no vibration energy is lost. In addition, it is possible to oscillate the resin at a higher vibration frequency than before, causing a sufficient shearing heat to allow smooth cut surfaces in such a case as punching process.

Furthermore, a servo valve or a proportional flow valve may be used as vibratory means for the vibration generator and the position control can be carried out by moving a piston forwards while operating to apply vibration, thereby significantly improving a processing precision.

In the second aspect of the present invention to achieve the above mentioned second object, there is provided an injection molding machine comprising a vibratory plate in a movable mold half, the vibratory plate being provided with a vibratory member projected therefrom for locally pressurizing or cutting, with the application of a pressure, the resin in the cavity, an ejector pin having a flange provided at the rear end or base thereof, the ejector pin being inserted into a recess formed in the vibratory plate at the rear portion thereof and passed through the vibratory plate, and a locking edge projected from and fixed to the vibratory plate in the rear recess formed at a desired distance from the flange, the ejector pin being supported by a supporting member at the base thereof, the supporting member being projected from the inner surface of the bottom plate, the distal end or tip of the ejector pin along with the tip of the vibratory member facing the cavity. Furthermore, the above-mentioned vibratory member is formed into a hollow cylinder or a tube with the tip thereof facing the center of the cavity and has the above-mentioned ejector pin therein to allow the movement thereof relative to the vibratory member.

In such a constitution, the vibration that the vibratory plate receives through the vibratory rod is directly transmitted to the vibratory member, but not transmitted to the ejector member due to back space. Only the vibratory member thus vibrates in the axial direction to oscillate the resin at the position where the tip of the vibratory member contacts to achieve a processing operation such as gate cutting, punching or compression with pressure. When the vibratory rod is moved forward after the mold is opened, the vibratory plate also advances to reduce the above-mentioned space and thereby the locking edge contacts with the flange, consequently moving the ejector pin forward together with the vibratory plate and pushing out a molded product from the cavity half to remove it from the mold.

This simple construction of the mold reduces the size and cost of the mold because the second aspect requires no ejector plate and only the moving space of the vibratory plate needs to be provided in the movable mold half. In addition, the vibratory device can be used for the ejection to eliminate the ejector device which otherwise is required in the conventional molds, because the vibratory plate can be used also as the ejector plate. Furthermore, since the base of the ejector pin is supported by the supporting member projected from the inner surface of the bottom plate and the tip of the ejector pin faces the cavity together with the tip of the above-mentioned vibratory member so that vibration can be performed first, the ejector pin does not happen to be operated during a vibrating step and the vibratory plate can be sure to perform two operations, i.e., vibration and ejection, which can also be applied to existing molds.

DETAILED DESCRIPTION OF THE PREFERRED EMBODIMENTS

FIGS. 1 to 5 show a first embodiment of the present invention.

Figure 1:
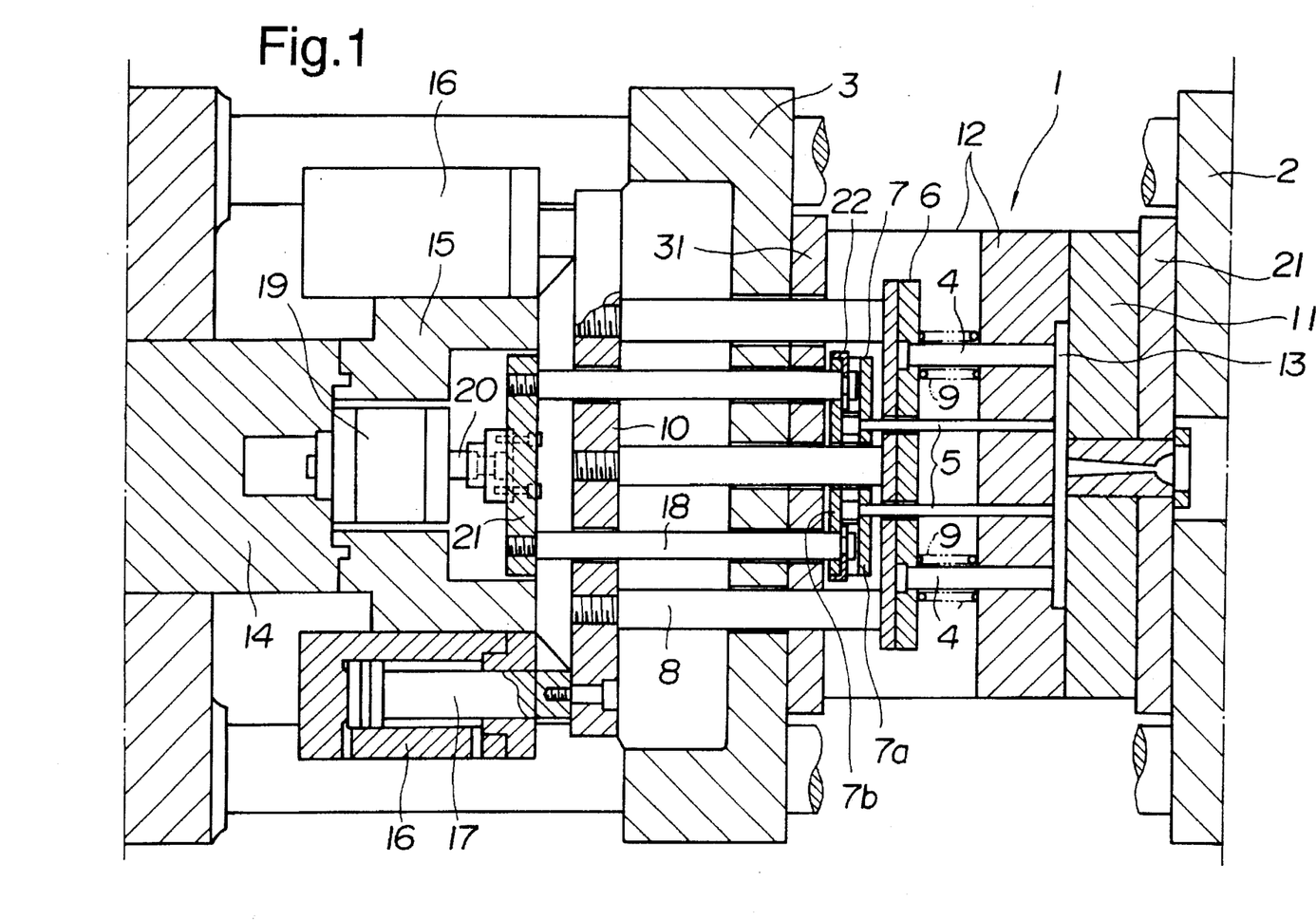
FIG. 1 is a longitudinal sectional side view of a mold having a vibration processing device and a mold clamping device according to a first embodiment of the present invention.

In the figures, denoted by the reference numeral 1 is a mold which is formed of a stationary mold half 11 and a movable mold half 12. The stationary mold half 11 is attached to a stationary platen 2 through a bottom plate 21. The movable mold half 12 is attached to a movable platen 3 through a bottom plate 31 and is disposed in such a manner that it is movable relative to the stationary platen 2. Both the mold halves defines a cavity 13 when they are closed.

Into the above-mentioned movable mold half 12, ejector pins 4 and vibratory pins 5 are inserted in such a manner that they can move in an axial direction, with each distal end or tip thereof facing the above-mentioned cavity 13. Formed at the rear portion of the movable mold half 12 is a space where an ejector plate 6 and a vibratory plate 7 are disposed in parallel to the movable platen 3. In this event, the term "rear" is used as opposed to the front relative to the traveling direction of the movable mold half and means the side of the movable mold half 12 opposite to the stationary mold half 11. The ejector pins 4 are connected to the ejector plate 6 while the vibratory pins 5 are connected to the vibratory plate 7, passing through the ejector plate 6.

Ejector rods 8 passing through the above-mentioned movable platen 3 and bottom plate 31 are abutted to the back side of the ejector plate 6. The ejector plate 6 is provided, on the front surface thereof, with return springs 9 disposed around the respective ejector pins 4 between the ejector plate 6 and the movable mold half 12. With these return springs 9, the tip of each ejector rod 8 normally contacts with the ejector plate 6. The base of each ejector rod 8 is attached to a base plate 10 with a screw. The base plate 10 is attached to pistons 17 of hydraulic pressure operated ejector cylinders 16 fixed at both the upper and lower sides of a connecting member 15 with a mold clamping ram 14 located behind the center of the rear side of the movable platen 3.

Connected the above-mentioned vibratory plate 7 on the back side thereof are vibratory rods 18 disposed while passing through the bottom plate 31, the movable platen 3 and the base plate 10. The base of each vibratory rod 18 are screwed on a plate 21 which is fixed with screws to a vibrating shaft 20 of a hydraulic cylinder type vibration generator 19 incorporated in the central portion of the above-mentioned connecting member 15. The hydraulic circuit of the vibration generator 19 is equipped with a proportional flow valve and a servo valve (either not shown) and by operating these valves, the vibrating shaft 20 moves back and forth to generate vibration and perform position control.

Figure 2:
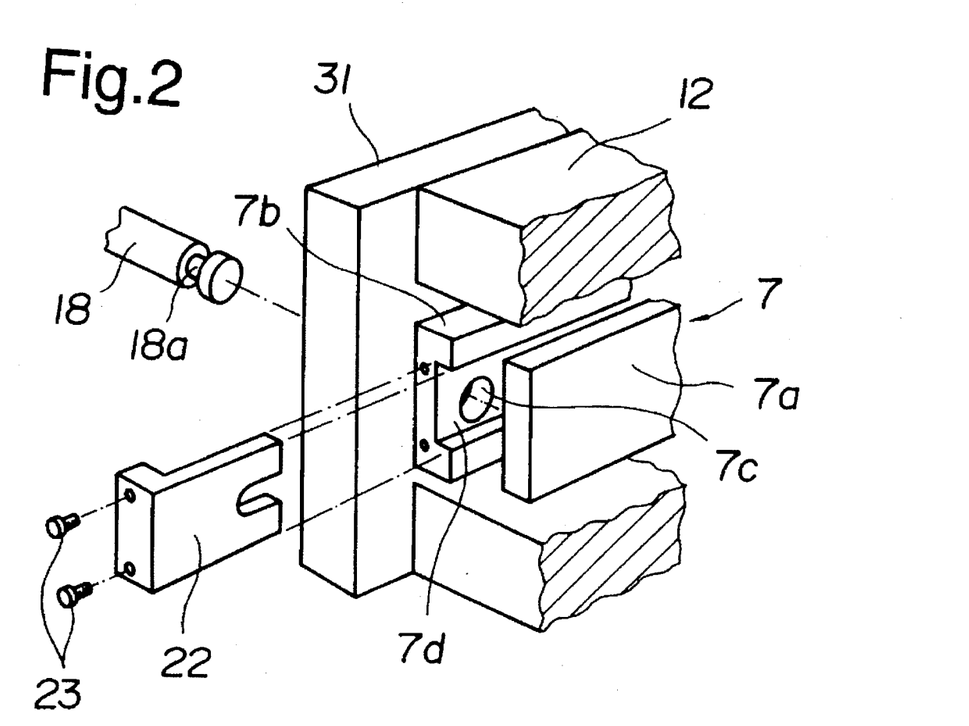
FIG. 2 is a partial perspective view of essentials for use in describing a connecting unit between a vibratory plate and a vibratory rod.

As shown in FIG. 2, the above-mentioned vibratory plate 7 is constructed by means of integrally combining a flat front plate 7a with vibratory pin inserting holes (not shown) and an U-shaped rear plate 7b with rod holes formed therein at the required positions, with a concave portion (groove) 7d facing inside, and the tip of the above-mentioned vibratory rod 18 is inserted into the corresponding rod hole 7c. The tip of these vibratory rods 18 projecting toward the above-mentioned groove 7d has an annular groove 18a formed along the periphery thereof, into which a board-like connecting member 22 with its tip divided into two parts is inserted from the side direction and furthermore its curved end is fixed with screws 23 to the side face of the rear plate 7b, thereby integrally connecting the vibratory plate 7 and the vibratory rods 18.

Figure 3:
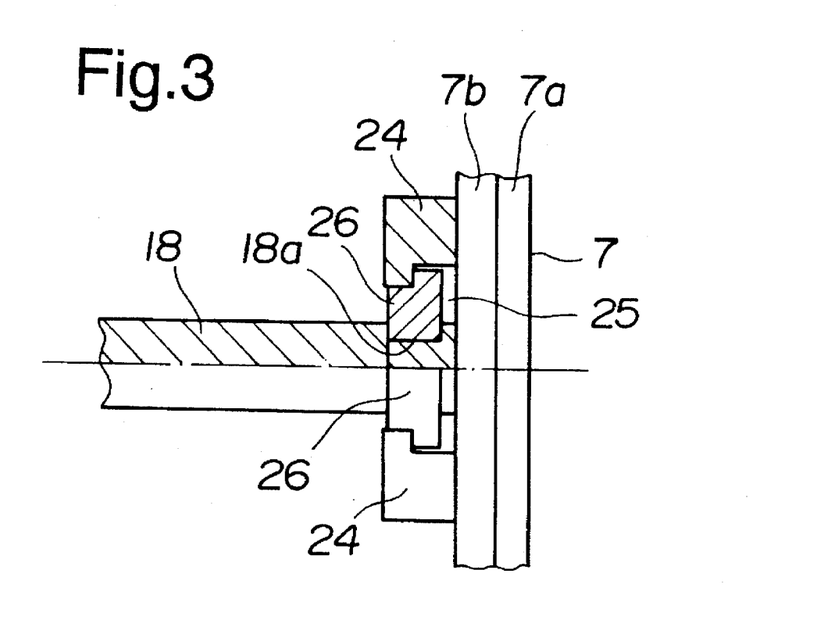
FIG. 3 is a view for use in describing a section of a half of a connecting unit between a vibratory plate and a vibratory rod.

FIG. 3 shows another connecting means. A pair of engaging pieces 24 each having a flange are oppositely disposed with its flange facing inside and with a required spacing. The tip of the above-mentioned vibratory rod 18 is inserted into a hollow 25 formed. At the same time, a connecting member 26 having a convex cross-section and with its tip divided into two parts is inserted from the side direction into the hollow 25. The front portion of the vibratory rod 18 and the engaging pieces 24 are integrally combined to connect the vibratory plate 7 and the vibratory rod 18. In this case, the curved end of the connecting member 26 is also fixed to the side face of the rear plate 7b.

In both of the above-mentioned embodiments, the vibratory plate 7 and the vibratory rod 18 can be connected and disconnected by means of inserting the connecting members 24 and 26 from the side direction of the movable mold half 12. This can be performed with the movable mold half 12 attached to the movable platen 3.

Figure 4:
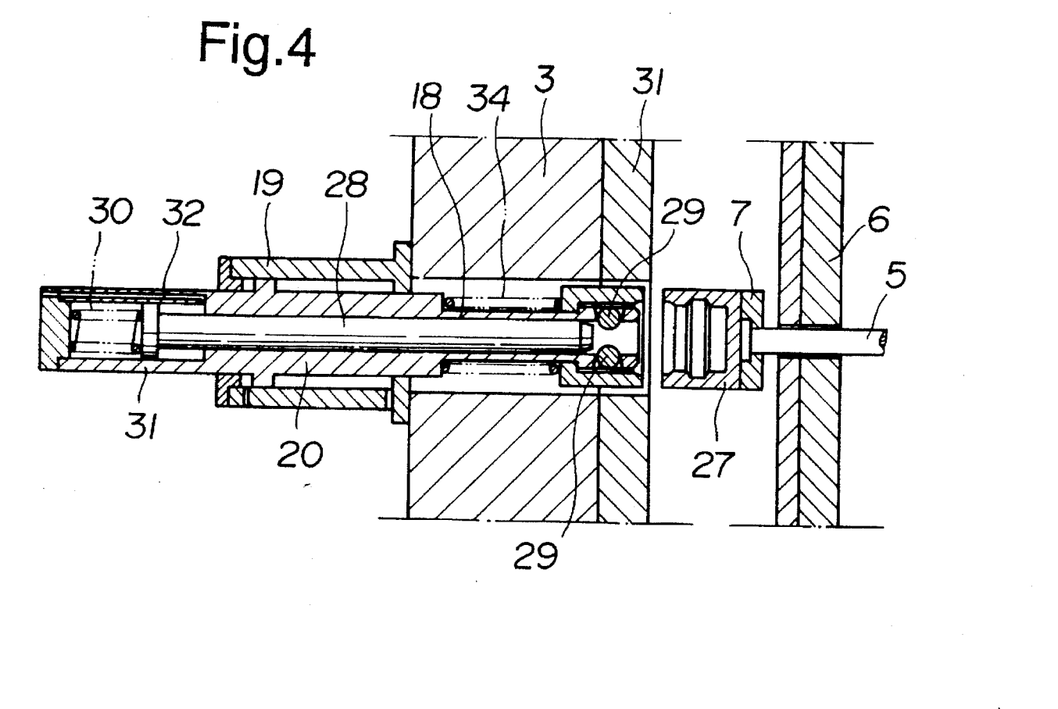
FIG. 4 is a sectional view describing another connecting unit between a vibratory plate and a vibratory rod with a ball chuck.

FIG. 4 shows an example using a ball chuck for the connection. The vibratory plate 7 with the above-mentioned vibratory pin 5 fixed to it contacts with the cylindrical receiving member 27 having an annular groove formed along the circumference thereof. In addition, the vibratory rod 18 combines integrally with the vibrating shaft 20 of the vibration generator 19 attached behind the movable platen 3. The vibratory rod 18 and the vibrating shaft 20 are tube-like and a rod member 28 for locking is inserted into and passing through the rod and the shaft. The outer diameter of the tip of the vibratory rod 18 is a little smaller than the inner diameter of the above-mentioned receiving member 27. The connector 29, which is made up of a plurality of steel balls engaged within the above-mentioned annular groove, is received with a play in a taper hole and provided in such a manner that it can extended out and retracted into the hole.

The above-mentioned vibration shaft 20 passes through the vibrating cylinder in the vibration generator 19. The shaft 20 has a cylinder 31 for locking formed inside the rear end portion thereof. The rear end of the rod member 28 is pressed against the cylinder 31 against the spring force of spring members 30. The cylinder 31 has a pressure channel 32 through which the rod member 28 moves backward. The tip of the vibratory rod 18 is inserted into the cylindrical covering member 33 in such an axially movable manner. The covering member 33 is normally pressed by the spring member 34 against the stepped portion of the tip of the rod member so as to press inward the above mentioned connector 29.

Figure 5:
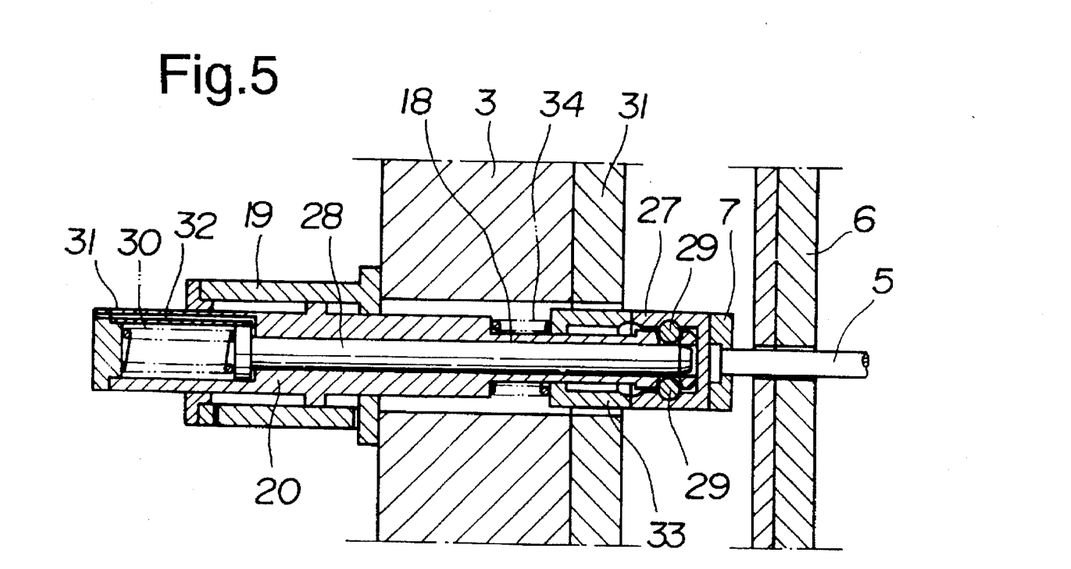
FIG. 5 is a sectional view showing a connecting state of the above-mentioned connecting unit.

In such a constitution, at a state shown in FIG. 4 that the restriction for the connector 29 to move inward is removed, the receiving member 27 on the side of the vibratory plate is pressed with the end portion of the covering member 33 contacted with it, the connector 29 is arranged to face the annular groove, and the pressure of the fluid against the rod member 28 is released. Then, as shown in FIG. 5, the rod member 28 is moved forward by the spring pressure, returned back to the original position, and then presses the connector 29 outward into the annular groove. As a result, the connector 29 is fitted into both the taper hole on the side of the vibratory rod and the annular groove on the side of the receiving portion and held by the rod member 28 to connect the vibratory plate 7 with the vibratory rod 18. In order to release the connection, hydraulic pressure or compressed air is injected into the front chamber of the cylinder 31 to retract the rod member 28 and allow the connector 29 to move inside without any restriction and then the vibratory plate 7 is drawn back. Therefore, when the movable mold half 12 is removed from the movable platen 3, the connection of the vibratory plate 7 with the vibratory rod 18 does not prevent the removal.

FIGS. 6 to 9 show an embodiment of the second invention.

Figure 6:
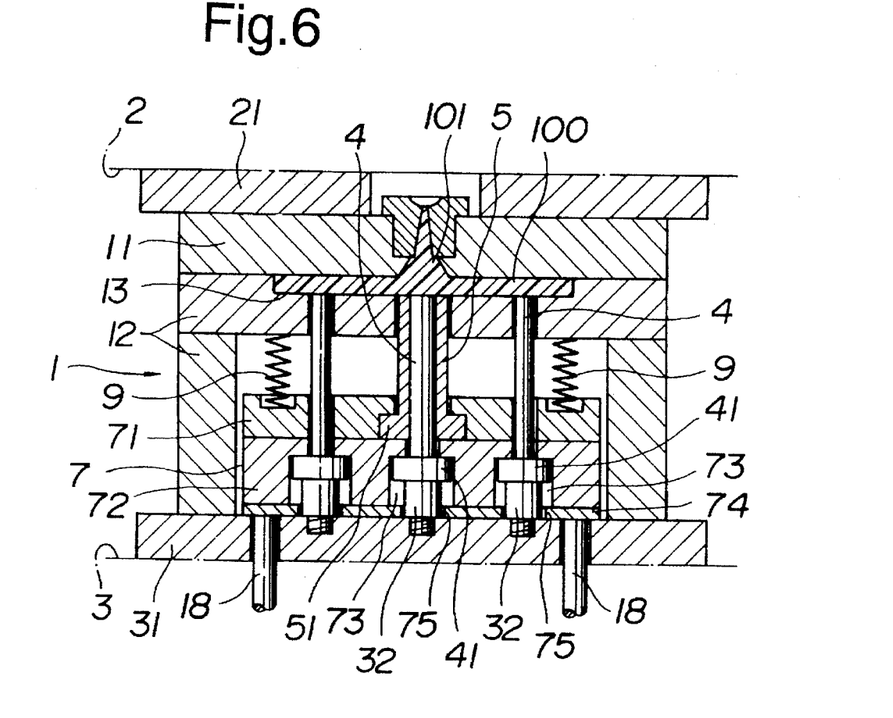
FIG. 6 is a sectional view of a second embodiment of an injection mold while closing the mold.

Similar to the first embodiment, a mold 1 is formed of a stationary mold half 11 and a movable mold half 12. The stationary mold half 11 is attached to a stationary platen 2 through a bottom plate 21. The movable mold half 12 is attached to a movable platen 3 through a bottom plate 31 and is disposed in such a manner that it is movable relative to the stationary platen 2. Both the mold halves defines a cavity 13 when they are closed.

Into the above-mentioned movable mold half 12, ejector pins 4 and vibratory members 5 are inserted in such a manner that they can move in an axial direction, with each distal end or tip thereof facing the above-mentioned cavity 13. Formed at the rear portion of the movable mold half 12 is a space where a vibratory plate 7 is disposed in such a manner it is movable back and force with return springs 9. The ejector pin 4 and the vibratory member 5 are disposed on the vibratory plate 7.

The above-mentioned vibratory plate 7 may have a cross-shaped front configuration (which is not shown in Figs.). The vibratory plate 7 is formed of a front plate 71 and a rear plate 72 which are piled up and combined integrally with, for example, bolts (not shown). The central crossing portion of the above-mentioned front plate 71 has an insert hole formed therein for the tubular vibratory member 5 and has through-holes at both sides thereof for the ejector pins 4. The above-mentioned rear plate 72 is provide with recesses 73 on its back. The recesses 73 are arranged into concentric circles corresponding to the above-mentioned central portion and the positions of the through-holes. Extending holes from inner holes of the vibratory member 5 or the above-mentioned insert hole are provided at the center of each recess 73.

The above mentioned ejector pins 4 and the vibratory member 5 have flanges 41 and 51, respectively, at the rear end thereof. The vibratory member 5 is projected from the front surface of the vibratory plate 7 with the flange 51 thereof held by the front plate 71 and the rear plate 72. In addition, the ejector pins 4 are movably projected into the front portion of the vibratory plate 7 or into the vibratory member. More specifically, the ejector pins 4 are each inserted into the through-hole or into the vibratory member from the above mentioned recess 73 to place the flange 41 inside the recess 73 and are held by the supporting member 32. The supporting member 32 has a diameter smaller than those of the flanges 41 and is projected toward the inside of the above-mentioned bottom plate 31.

A locking plate 74, which moves forward the ejector pins 4 along with the vibratory plate 7 using the above-mentioned flanges 41, is attached to the back of the above-mentioned rear plate 72 with, for example, screws (not shown). At each position of the above-mentioned recesses 73, the flange 74 is provided with an opening which has a diameter smaller than that of the above mentioned recess but larger than that of the above-mentioned supporting member and the periphery of the opening projects at the position having a desired spacing behind the flange 41 and forms a locking edge 75 which is engaged with the flange 41 and moves the ejector pins 4 forward together with the vibratory plate 7.

The vibratory rod 18 abuts against the above-mentioned vibratory plate 7 passing through the bottom plate 31 and the movable platen 3. This vibratory rod 18 is, in the same manner as that of FIG. 1, connected with the vibrating shaft of the vibration generator behind the movable platen (not shown), moves back and forth to generate vibration by operating a proportional flow valve or a servo valve equipped by the hydraulic circuit of the vibration generator, and hence can control an advancing position.

In the above-mentioned construction of an injection mold 1, the vibration received by the vibratory plate 7 through the vibratory rod 18 is directly transferred to the vibratory member 5. This vibration is not transferred to the ejector pin 4 because of the existence of the space behind the flange 41 incorporated in the recess 73 and only the vibrating member 5 vibrates axially and advances while oscillating with its tip the resin injected into the cavity 13.

Figure 7:
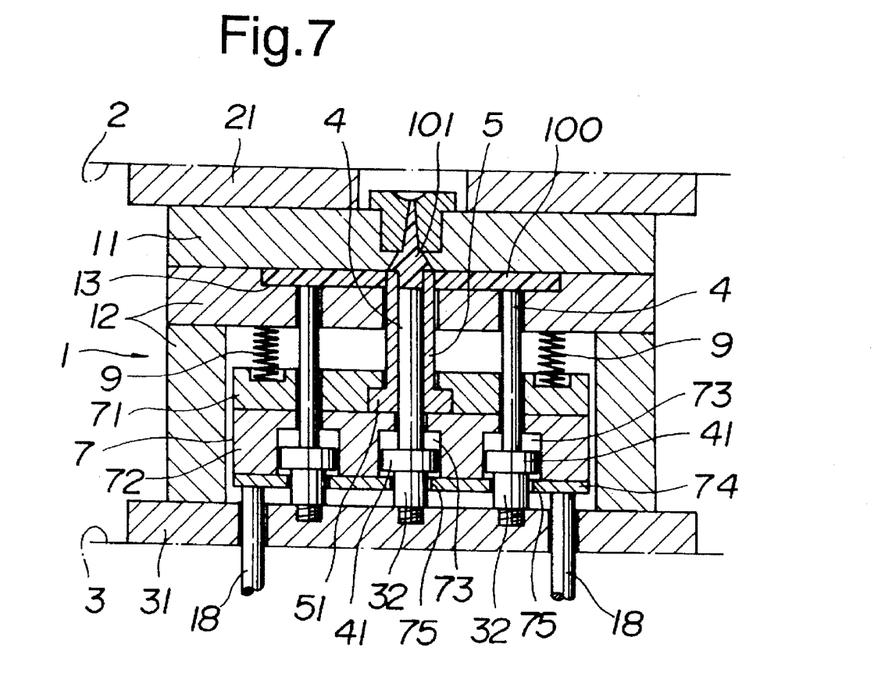
FIG. 7 is a sectional view of the above-mentioned embodiment while punching a molded product.

Thus, the central portion of the molded product 100 formed in the cavity 13 is punched through with the above-mentioned tubular vibratory member 5 and the spur 101 is cut off as shown in FIG. 7.

Figure 8:
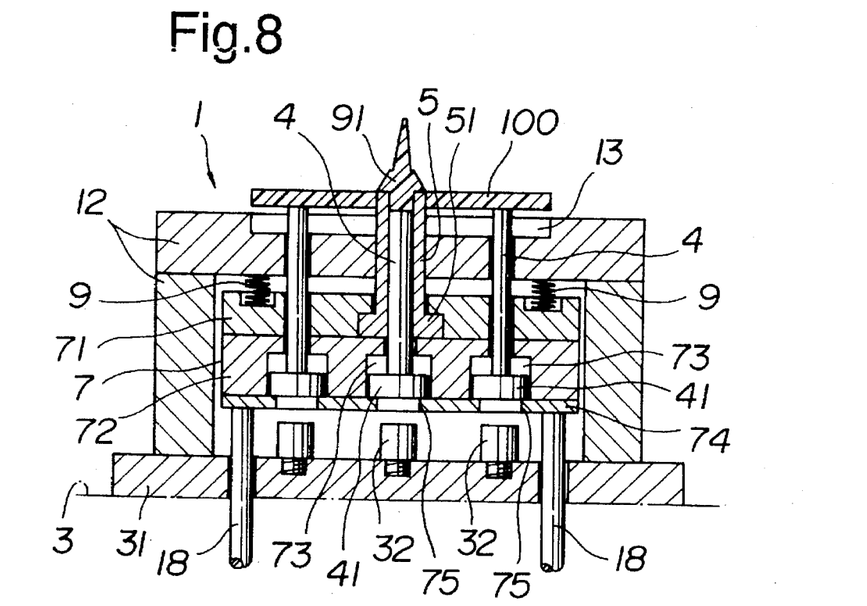
FIG. 8 is a sectional view of the above-mentioned embodiment while removing a molded product from the mold.

When the vibratory rod 18 is further moved forward after the opening of the mold, the vibratory plate 7 advances together with the vibratory member 5 to reduce the above-mentioned space and the locking edge 75 contacts with the flange 41. Thus, the ejector pin 4 moves forward together with the vibratory plate 7. Then the ejector pin 4 at the center ejects the spur 101 and the ejector pins 4 at both sides eject the molded product 100 from the cavity half and the spur 101 and molded product 100 are removed from the mold as shown in FIG. 8.

When the vibratory rod 18 is moved backward after parting, the vibratory plate 7 is returned back to the original position due to the return springs 9 and the elector pins 4 are supported by the supporting member 32 to become ready for the next ejection.

Figure 9:
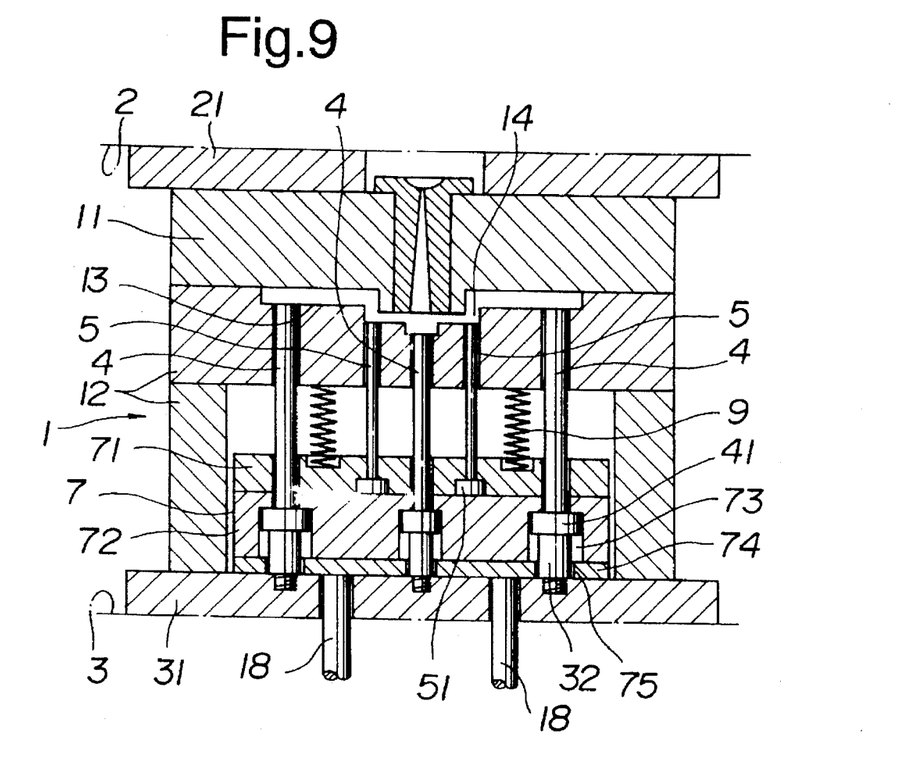
FIG. 9 is a sectional view of a third embodiment while closing the mold.

An example shown in FIG. 9 is a case where the gate 14 in the cavity is cut with the vibratory member. In this case, the vibratory member 5 is arranged to face the gate 14 by the pin and the gate cutting is performed by vibrating the pin together with the vibratory plate 7.

When the resin in the cavity is locally pressed and compressed by the vibratory member and its flowability is intended to be improved by applying vibration on the resin in a melted state, the ejector member and the vibratory member are only disposed according to the objects and the constitutional modification is not required (explanation by an example is not shown).

What is claimed is:

1. An injection molding machine having an assembly for vibration processing comprising:
   an injection mold formed of a stationary mold half attached to a stationary platen of the molding machine and a movable mold half attached to a movable platen which is movable relative to the stationary platen, said injection mold having a cavity formed between the mold halves when said mold is closed;
   a vibratory plate contained within the movable mold half and having a desired number of vibratory members secured onto the front surface thereof, the vibratory members being for use in locally pressurizing or cutting, with the application of a pressure, the resin in the cavity; and
   a vibratory rod passing through a bottom plate adjacent said movable platen from a vibration generator disposed behind the movable platen to the movable mold half, said vibratory rod having an end integrally connected to said vibratory plate.

2. An injection molding machine having an assembly for vibration processing as claimed in claim 1, wherein the movable mold half has a cavity formed in a rear portion thereof where an ejector plate and the vibratory plate are disposed in parallel and wherein return springs are disposed between the ejector plate and the movable mold half, a plurality of ejector pins each having a proximal end inserted into said ejector plate and a distal end inserted into a front portion of said movable mold half in such a manner that the ejector pins are movable in an axial direction, the ejector pins being biased to a back surface of the ejector plate by means of the return springs, said vibratory members being fixedly secured to a front surface of said vibratory plate while passing through the ejector plate.

3. An injection molding machine having an assembly for vibration processing as claimed in claim 1, wherein said vibratory plate is formed of a flat front plate having insert holes formed therein for the vibratory members and a rear plate having a groove and rod holes formed therein at desired positions for said at least one vibratory rod, the front and the rear plates being assembled integrally with each other with the groove facing inside, a front portion of the at least one vibratory rod where annular grooves are formed around its periphery being inserted from a side into the rod holes of the rear plate, a connecting member being inserted into the annular groove within the groove, the connecting member being flat and having a bifurcated end, and a curved end being fixedly secured on a rear end of the rear plate by using a screw to connect said vibratory plate and said vibratory rods integrally.

4. An injection molding machine having an assembly for vibration processing as claimed in claim 1, wherein said vibratory plate and said vibratory rod are connected by means of annular grooves formed around the periphery of the end of said vibratory rod, a pair of engaging pieces each with a flange disposed at a desired distance behind a rear plate of said vibratory plate, and a bifurcated convex connecting member having a sectional configuration in conformity with a hollow region formed between the pair of engaging pieces with the respective flanges facing inside in such a manner that the end of said vibratory rod inserted into the hollow region is engaged with the respective flanges of the pair of engaging pieces by means of the connecting member inserted from a side of the hollow region to integrally connect said vibratory rod with the back surface of said vibratory plate.

5. An injection molding machine having an assembly for vibration processing as claimed in claim 1 further comprising connecting means for connecting said vibratory plate with a vibrating shaft, said connecting means having a cylindrical receiving member with an annular groove formed therein around the inner periphery thereof, the cylindrical receiving member being provided on the back of said vibratory plate; the vibrating shaft passing through a cylinder of the vibration generator attached behind the movable platen, the vibrating shaft having a rear end in which a cylinder for locking is formed, the shaft being used as a vibrating piston; the vibratory rod being hollow and combined integrally with the vibrating shaft, the vibratory rod with a tip having an outer diameter slightly smaller than the inner diameter of the receiving member, the vibratory rod being provided with a taper hole formed therein for receiving with a play a connector made up of a plurality of steel balls engagable with the annular groove, the connector being provided in such a manner that it moves forward or backward; a rod member for locking inserted between the vibratory rod and the vibrating shaft; a spring member in the cylinder at the rear end of the vibrating shaft, the spring member connecting said vibratory plate with the vibrating shaft through the receiving member by constantly pressing the rod member in an axial direction and inserting the connector into the annular groove in the receiving member fitted to the periphery of a rear end of the vibratory rod; and a pressure channel in the cylinder for use in releasing engagement by the connector by means of moving the rod member backward.

6. An injection molding machine having an assembly for vibration processing comprising an injection mold formed of a stationary mold half attached to a stationary platen of the molding machine and a movable mold half attached to a movable platen which is movable relative to the stationary platen, said injection mold having a vibratory plate contained within the movable mold half and having a vibratory member for use in locally pressurizing or cutting, with the application of a pressure, the resin in a cavity, wherein said injection molding machine comprises the vibratory plate in the movable mold half, the vibratory plate being provided with a vibratory member projected therefrom for locally pressurizing or cutting, with the application of a pressure, the resin in the cavity, an ejector pin having a flange provided at the rear end thereof, the ejector pin being inserted into a recess formed in the vibratory plate at a rear portion thereof and passed through the vibratory plate, and a locking edge projected from and fixed to the vibratory plate in a rear recess formed at a desired distance from the flange, the ejector pin being supported by a supporting member at a base thereof, the supporting member being projected from an inner surface of a bottom plate disposed between said movable mold half and said movable platen, a tip of the ejector pin along with the tip of the vibratory member facing the cavity.

7. An injection molding machine having an assembly for vibration processing as claimed in claim 6, wherein the vibratory member is formed into a hollow cylinder or a tube with the tip thereof facing the center of the cavity and has the ejector pin therein to allow the movement thereof relative to the vibratory member.

* * * * *